United States Patent
Maida, Jr. et al.

(10) Patent No.: US 9,329,334 B2
(45) Date of Patent: May 3, 2016

(54) SIDE-HOLE CANE WAVEGUIDE SENSOR

(71) Applicant: Weatherford/Lamb, Inc., Houston, TX (US)

(72) Inventors: John L. Maida, Jr., Houston, TX (US); Alan D. Kersey, South Glastonbury, CT (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 0 days.

(21) Appl. No.: 14/169,969

(22) Filed: Jan. 31, 2014

(65) Prior Publication Data

US 2014/0147074 A1 May 29, 2014

Related U.S. Application Data

(60) Continuation of application No. 13/922,816, filed on Jun. 20, 2013, now Pat. No. 8,687,926, which is a continuation of application No. 12/716,035, filed on Mar. 2, 2010, now Pat. No. 8,494,322, which is a (Continued)

(51) Int. Cl.
*G02B 6/00* (2006.01)
*G02B 6/02* (2006.01)
(Continued)

(52) U.S. Cl.
CPC .......... *G02B 6/02314* (2013.01); *E21B 47/123* (2013.01); *G01L 1/242* (2013.01);
(Continued)

(58) Field of Classification Search
CPC .... G02B 6/021; G02B 6/262; G02B 6/02314; G02B 6/02338; G02B 6/02385
USPC ......... 385/11–13, 37, 123, 125; 73/62, 61.47, 73/61.67, 702, 723
See application file for complete search history.

(56) References Cited

U.S. PATENT DOCUMENTS

| 4,837,777 A | * | 6/1989 | Jones | ................. G01L 11/02 250/227.11 |
| 4,882,716 A | | 11/1989 | Lefevre et al. | |

(Continued)

FOREIGN PATENT DOCUMENTS

| CA | 2394910 | 6/2001 |
| GB | 2278917 | 12/1994 |

(Continued)

OTHER PUBLICATIONS

Search Report dated Jul. 26, 2004, issued by the UK Patent Office in Application No. GB 0403963.2.

(Continued)

*Primary Examiner* — Ryan Lepisto
*Assistant Examiner* — Mary El Shammaa
(74) *Attorney, Agent, or Firm* — Patterson & Sheridan, L.L.P.

(57) ABSTRACT

A side-hole optical cane for measuring pressure and/or temperature is disclosed. The side-hole cane has a light guiding core containing a sensor and a cladding containing symmetrical side-holes extending substantially parallel to the core. The side-holes cause an asymmetric stress across the core of the sensor creating a birefringent sensor. The sensor, preferably a Bragg grating, reflects a first and second wavelength each associated with orthogonal polarization vectors, wherein the degree of separation between the two is proportional to the pressure exerted on the core. The side-hole cane structure self-compensates and is insensitive to temperature variations when used as a pressure sensor, because temperature induces an equal shift in both the first and second wavelengths. Furthermore, the magnitude of these shifts can be monitored to deduce temperature, hence providing the side-hole cane additional temperature sensing capability that is unaffected by pressure. Additionally, the side-hole cane can be used to measure a differential pressure between a first pressure ported to the side-holes and a second external pressure.

28 Claims, 10 Drawing Sheets

Related U.S. Application Data continuation of application No. 11/179,868, filed on Jul. 12, 2005, now Pat. No. 7,669,440, which is a division of application No. 10/371,910, filed on Feb. 21, 2003, now Pat. No. 6,931,188.

(51) Int. Cl.
*E21B 47/12* (2012.01)
*G01L 1/24* (2006.01)
*G01L 11/02* (2006.01)
*G02B 6/024* (2006.01)
*G02B 6/26* (2006.01)
*G02B 6/028* (2006.01)

(52) U.S. Cl.
CPC ............... *G01L 1/245* (2013.01); *G01L 1/246* (2013.01); *G01L 11/025* (2013.01); *G02B 6/021* (2013.01); *G02B 6/024* (2013.01); *G02B 6/028* (2013.01); *G02B 6/0281* (2013.01); *G02B 6/02338* (2013.01); *G02B 6/262* (2013.01); *G02B 6/022* (2013.01)

(56) References Cited

U.S. PATENT DOCUMENTS

| | | | | |
|---|---|---|---|---|
| 4,902,977 A * | 2/1990 | Kenny | ............... | G01L 21/32 324/460 |
| 4,915,467 A | 4/1990 | Berkey | | |
| 5,007,705 A | 4/1991 | Morey et al. | | |
| 5,178,153 A * | 1/1993 | Einzig | ............... | A61B 5/0261 356/477 |
| 5,399,854 A | 3/1995 | Dunphy et al. | | |
| 5,615,295 A | 3/1997 | Yoshida et al. | | |
| 5,745,626 A | 4/1998 | Duck et al. | | |
| 5,828,059 A * | 10/1998 | Udd | ............... | 250/227.18 |
| 5,841,131 A | 11/1998 | Schroeder et al. | | |
| 6,208,776 B1 * | 3/2001 | Prohaska et al. | ............... | 385/13 |
| 6,278,821 B1 | 8/2001 | Carberry et al. | | |
| 6,287,980 B1 * | 9/2001 | Hanazaki | ............... | H01L 21/67069 156/345.28 |
| 6,304,686 B1 | 10/2001 | Yamate et al. | | |
| 6,330,831 B1 * | 12/2001 | Lynnworth | ............... | G01F 1/662 73/861.28 |
| 6,414,262 B1 | 7/2002 | Rao | | |
| 6,422,084 B1 * | 7/2002 | Fernald | ............... | G01L 11/025 250/231.19 |
| 6,439,055 B1 | 8/2002 | Maron et al. | | |
| 6,471,417 B1 | 10/2002 | Want et al. | | |
| 6,490,931 B1 * | 12/2002 | Fernald et al. | ............... | 73/705 |
| 6,597,821 B1 | 7/2003 | Bohner et al. | | |
| 6,982,996 B1 | 1/2006 | Putnam et al. | | |
| 7,024,081 B2 * | 4/2006 | Dowd | ............... | G02B 6/4492 166/351 |
| 7,646,953 B2 * | 1/2010 | Dowd | ............... | E21B 17/206 385/109 |
| 8,041,165 B2 * | 10/2011 | Neuroth | ............... | G02B 6/4427 385/101 |
| 9,025,922 B2 * | 5/2015 | Oyamada | ............... | C03C 25/607 385/123 |
| 2003/0174948 A1 | 9/2003 | Davis et al. | | |
| 2003/0231846 A1 | 12/2003 | Fajardo et al. | | |
| 2004/0037485 A1 * | 2/2004 | Kersey | ............... | 385/12 |
| 2012/0234101 A1 * | 9/2012 | Vigneaux | ............... | G01L 1/246 73/800 |

FOREIGN PATENT DOCUMENTS

| | | |
|---|---|---|
| WO | 99/32863 | 7/1999 |
| WO | 01/40835 A2 | 6/2001 |

OTHER PUBLICATIONS

Office Action dated Sep. 5, 2014, issued by the Canadian Intellectual Property Office in corresponding Application No. 2,740,053.

* cited by examiner

SIDE-HOLE CANE WAVEGUIDE SENSOR

CROSS-REFERENCE TO RELATED APPLICATIONS

This application is a continuation of co-pending U.S. patent application Ser. No. 13/922,816 filed Jun. 20, 2013, which is a continuation of U.S. patent application Ser. No. 12/716,035 filed Mar. 2, 2010, now U.S. Pat. No. 8,494,322 issued Jul. 23, 2013, which is a continuation of U.S. patent application Ser. No. 11/179,868 filed Jul. 12, 2005, now U.S. Pat. No. 7,669,440 issued Mar. 2, 2010, which is a divisional of U.S. patent application Ser. No. 10/371,910 filed Feb. 21, 2003, now U.S. Pat. No. 6,931,188 issued Aug. 16, 2005. The aforementioned related patent applications are herein incorporated by reference in their entireties.

BACKGROUND OF THE INVENTION

1. Field of the Invention

This invention relates generally to birefringent cane sensors, and more particularly, to a birefringent cane sensor having symmetrical side-holes for pressure and temperature sensing.

2. Description of the Related Art

Birefringent optical fibers for sensing parameters such as pressure are known in the art. In a birefringent fiber, birefringence is caused in part by the geometrical asymmetry that occurs when the optical fiber deforms under strain. However, because optical fibers are made of glass, and are typically fragile and small, they are relatively difficult to deform, which limits the sensitivity of such sensors. Typical fiber sensors, such as those made from standard fiber optic communication cables, have outer diameters in the range of 125 microns with optical cores of 7 to 12 microns and therefore have relatively low clad-to-core ratios.

Side-holes have been incorporated into fiber as is disclosed, for example, in U.S. Pat. No. 6,208,776, entitled "Birefringent Fiber Grating Sensor and Detection System," which is incorporated herein by reference. By incorporating side-holes into the cladding of the fiber, the fiber's mechanical compliancy is increased as well as its potential sensitivity and range when used as a sensor. Birefringent fibers have also in the prior art incorporated specific sensing elements such as Bragg gratings for measuring desired parameters including pressure and temperature, as is disclosed in U.S. Pat. No. 6,304,686, entitled "Methods and Apparatus for Measuring Differential Pressure with Fiber Optic Sensor Systems," which is incorporated herein by reference.

However, fiber optic based birefringent sensors are limited by their physical characteristics and manufacturing difficulties. For example, fiber sensors may not be subject to large pressures parallel to the axis of the fibers because the fibers may buckle. Additionally, fibers are small and delicate, and require special care during handling and manufacturing. Additionally, the protective buffer coating typically formed on standard optic cable has to be contented during manufacturing as one skilled in the art will understand, which adds manufacturing complexity and hence extra time and cost. Manufacturing yields for standard fiber-based sensors containing gratings can be lower than 10%, which is clearly not optimal. Formation of the side-holes in the relatively small cladding of the fiber can also be difficult to accomplish.

A waveguide that has been used to counteract some of the difficulties associated with optical "fibers" is a waveguide with a diameter ranging from about 0.3 mm to 4 mm, referred to as a "cane." Cane waveguides have a core and a cladding just as do standard fibers. In fact, the core of a single mode cane is generally the same diameter as the core of a single mode standard fiber, typically 7 to 12 microns. However, cane is thicker and sturdier than fiber because of the substantial amount of cladding. While a standard fiber has a diameter of 125 microns, cane ranges from 0.3 mm to about 4 mm, the great bulk of which constitutes cladding. The cane's relatively thick cladding provides significant mechanical benefits over fiber. Furthermore, a cane does not require a protective buffer layer, and thus eliminates manufacturing complexity.

The art would benefit from ways to improve the performance of pressure and temperature sensing in a side-hole fiber by utilizing the structure of a cane. Such an improvement is disclosed herein, specifically a cane-based side-hole sensor which has improved sensitivity, is easier to manufacture, handle, and package, is more resilient, and which otherwise substantially eliminates the shortcomings of fiber-based side-hole sensors. In particular, the art of oil/gas production would especially benefit from improved pressure sensors utilizing sturdier cane-based structures which are suitable for deployment in harsh environments such as oil/gas wells.

SUMMARY OF THE INVENTION

A side-hole optical cane for measuring pressure and/or temperature is disclosed. The side-hole cane has a light guiding core containing a sensor and a cladding containing symmetrical side-holes extending substantially parallel to the core. The side-holes cause an asymmetric stress across the core of the sensor creating a birefringent sensor. The sensor, preferably a Bragg grating, reflects a first and second wavelength each associated with orthogonal polarization vectors, wherein the degree of separation between the two is proportional to the pressure exerted on the core. The side-hole cane structure self-compensates and is insensitive to temperature variations when used as a pressure sensor, because temperature induces an equal shift in both the first and second wavelengths. Furthermore, the magnitude of these shifts can be monitored to deduce temperature, hence providing the side-hole cane additional temperature sensing capability that is unaffected by pressure. Additionally, the side-hole cane can be used to measure a differential pressure between a first pressure ported to the side-holes and a second external pressure.

The foregoing and other objects, features and advantages of the present disclosure will become more apparent in light of the following detailed description of exemplary embodiments thereof.

DETAILED DESCRIPTION

In the disclosure that follows, in the interest of clarity, not all features of actual commercial implementations of a side-hole cane sensor and related techniques are described. It will of course be appreciated that in the development of any such actual implementation, as in any such project, numerous engineering and design decisions must be made to achieve the developers' specific goals, e.g., compliance with mechanical and business related constraints, which will vary from one implementation to another. While attention must necessarily be paid to proper engineering and design practices for the environment in question, it should be appreciated that development of a side-hole cane sensor and related techniques would nevertheless be a routine undertaking for those of skill in the art given the details provided by this disclosure, even if such development efforts are complex and time-consuming.

Figure 1:
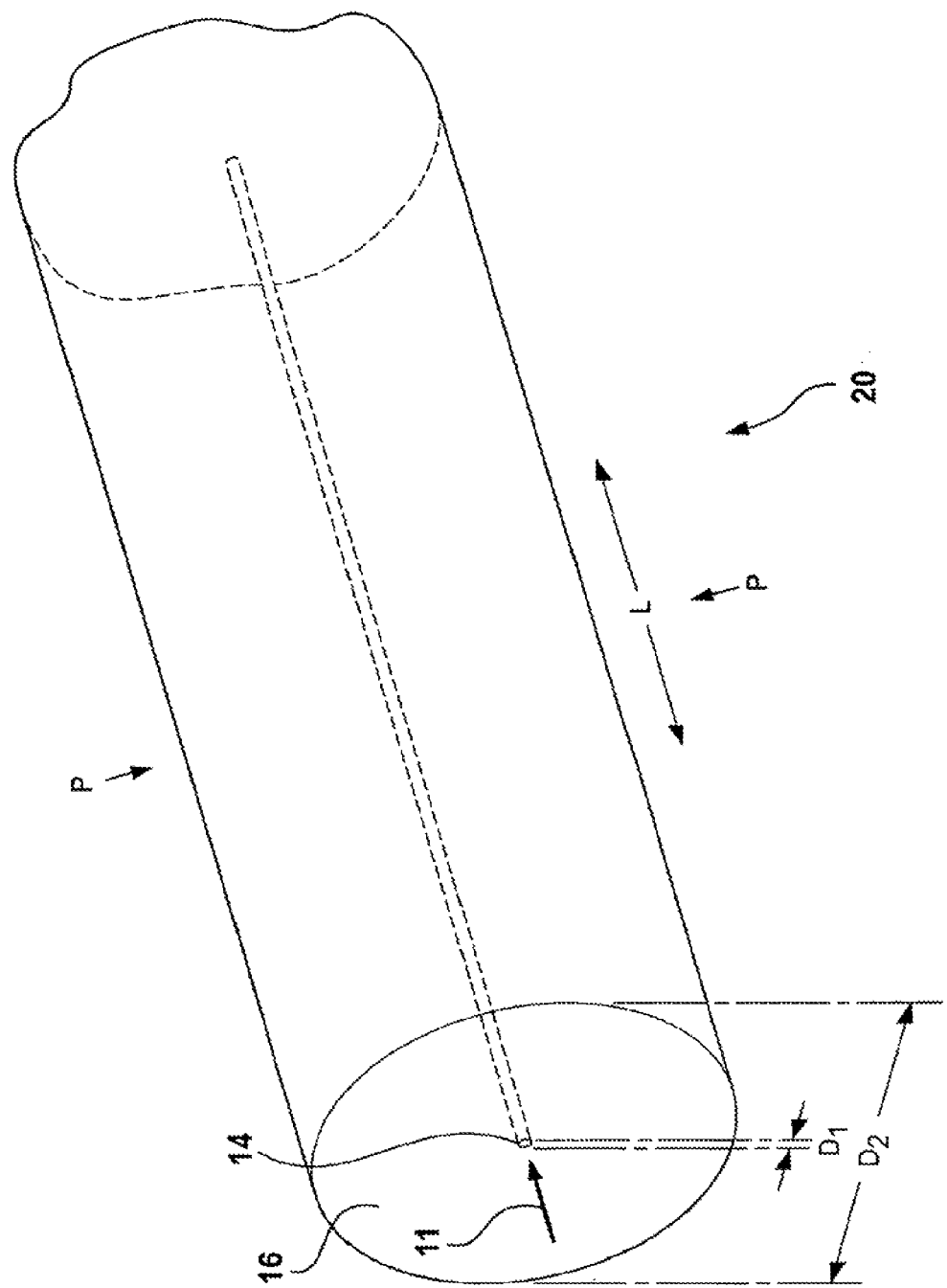
FIG. 1 is a side view perspective of a standard cane waveguide as is known.

Referring to FIG. 1, a large diameter "cane" optical waveguide 20 has at least one core 14 surrounded by a thick cladding 16. Known processes such as vapor phase deposition or direct-melt methods may produce the cane structure, such as is disclosed in U.S. patent application Ser. No. 09/455,868, filed Dec. 6, 1999 and entitled "Large Diameter Optical Waveguide, Grating, and Laser," which is incorporated herein by reference in its entirety. The cane waveguide 20 preferably comprises silica glass ($SiO_2$) based material having appropriate dopants, as is known, to allow light 11 to propagate through the core 14. Other materials for the cane waveguide 20 may be used if desired. For example, the cane waveguide 20 may be made of any glass, such as phosphate, aluminosilicate, borosilicate, fluoride glasses or other glasses, or may be made of plastic. The cane waveguide 20 may be made using fiber drawing techniques now known or later developed that provide the resultant desired dimensions for the core 14 diameter $D_1$ and the outer diameter $D_2$. The external surface of the cane waveguide 20 is preferably optically non-distorting, thereby allowing Bragg gratings to be written through the cladding 16 in a manner similar to that used for writing gratings into a conventional optical fiber 22.

As alluded to earlier, the clad-to-core diameter ratio of the cane 20 is exceptionally large when compared to fiber, typically ranging from about 30 to 1 to 300 to 1. (Fiber, by contrast, has a clad-to-core ratio of approximately 12 to 1). This substantial cladding 16 distinguishes a "cane" 20 from a standard "fiber" (such as standard 125 micron diameter communications fiber) and provides significant benefits in side-hole-based applications and manufacturing, as will be described in more detail below. The cladding 16 preferably has an outer diameter $D_2$ of at least 0.3 mm and generally about 4mm or more, and the core 14 preferably has an outer diameter $D_1$ of about 7 to 12 microns (such that it propagates only a single mode at or above the cutoff wavelength and a few (e.g., six or less) spatial modes below the cutoff wavelength as is known). The outer diameter $D_2$ of the cladding 16 and the length L are typically matched such that the cane 20 will resist buckling when placed in compression along the core's axis. By contrast, optical fiber is more easily susceptible to buckling, especially under the influence of stresses parallel to the core of the fiber, due to the larger length-to-diameter aspect ratios usually found in fiber-based sensors.

In addition to resisting buckling, the cane 20 has inherent mechanical rigidity which makes it easier to handle, improves its manufacturability and increases its suitability for uses in harsh sensing environments. For example, the cane 20 is more difficult to bend when compared to fiber. The rigidity makes cane 20 less susceptible to breakage and losses caused by bending. As is known, optical waveguides can only be bent to a certain degree (i.e., a bend radius) before optical attenuation becomes intolerable for a given application. Accordingly, standard fibers must be treated with care during packaging, transport and installation to reduce losses, but this is of less concern with cane 20. Cane therefore represents a substantially better base media for sensors, such as the inventive sensor configurations disclosed herein. As one skilled in the art will appreciate, the thickness of the cladding and/or the cladding-to-core ratio can be optimized to maximize these benefits for a given application.

The cane waveguide 20 may alternatively be formed by heating, collapsing, and/or fusing a glass capillary tube to a fiber (not shown) by a laser, filament, flame, etc., as is disclosed in U.S. patent application Ser. No. 09/455,865, filed Dec. 6, 1999, entitled "Tube-Encased Fiber Grating;" U.S. Pat. No. 6,422,084, entitled "Bragg Grating Pressure Sensor;" U.S. Pat. No. 5,745,626, entitled "Method for and Encapsulation of an Optical Fiber;" and U.S. Pat. No. 4,915,467, entitled "Method of Making Fiber Coupler Having Integral Precision Connection Wells," all of which are incorporated herein by reference in their entireties. Other techniques for fusing the tube to the fiber include the use of high temperature glass solders, e.g., silica solder (powder or solid), which allow the fiber, the tube, and the solder to become integrally fused to a standard fiber, or by the use of laser welding/fusing techniques.

Figure 2:
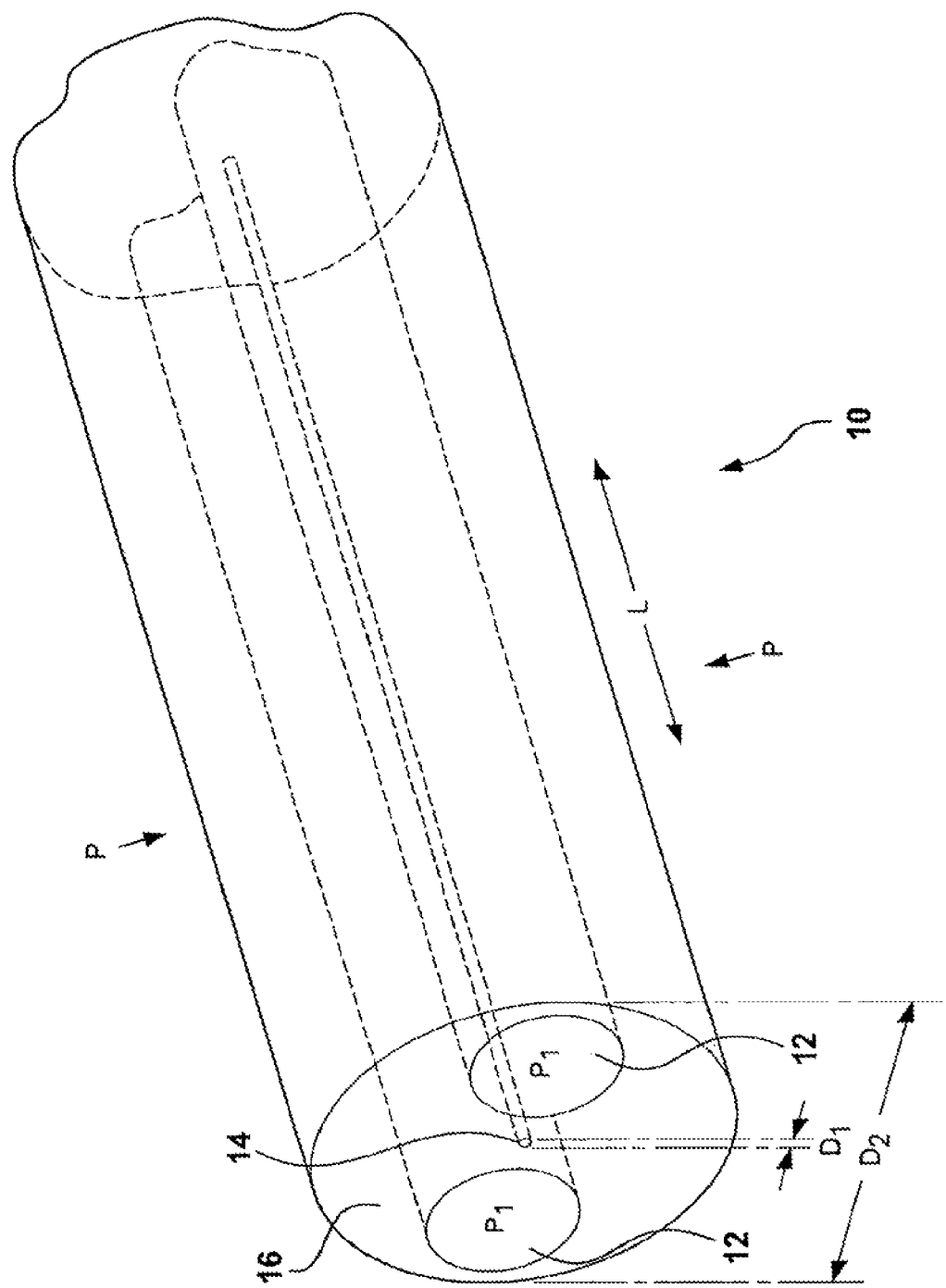
FIG. 2 a side view perspective of a side-hole cane, in accordance with one embodiment of the present invention.

Referring to FIG. 2, a side-hole cane waveguide 10 is shown according to one embodiment of the present invention. As shown, two symmetrical holes 12 extend through the cladding 16 substantially parallel to the core 14 of a cane waveguide 20. The side-holes 12 are preferably symmetrically located around the core 14. If the side-holes 12 are not symmetrical, the mass distribution in the cane 10 would be unequal. (Unequal mass distribution would effectively cause unbalanced stress distribution within the cane, thus causing the cane to deform or bend away from a linear orientation, which may impede the propagation of light through the core and increase attenuation). The present invention may further include a plurality of symmetrical side-holes, such as 3 or 4, symmetrically located around the core. For a 3-4 mm diameter cane 20, the side-holes 12 are preferably 1 mm in diameter, although this is not strictly necessary and could vary for different applications.

The side-holes 12 are preferably placed as near to the core as possible without entering the evanescent field of the core, which is the area where light propagating through the core region leaks into the cladding 16. The evanescent field may extend several wavelengths from the core 14. Locating the side-holes within this field may increase attenuation, especially if the side-holes 12 are filled with liquid.

The side-holes 12 of the side-hole cane 10 are preferably formed by boring symmetrical holes into a preform (not shown). An Excimer laser, a mechanical or other conventional drill or other known technique may bore the side-holes 12 into the preform. As one skilled in the art would realize, a "preform" is the structure which is subsequently heated and pulled to form the resulting cane. The side-hole cane 10 has a cladding to core ratio of generally 300 to 1, and therefore the cane preform necessarily should exhibit approximately the same ratio. The side-holes 12 are drilled into a suitable preform and then pulled to form the cane with the side-holes.

An alternative side hole cane manufacturing technique utilizes a method similar to the PANDA (polarization-maintaining and absorption reducing) technique used in forming birefringent fibers. As is known, the PANDA technique involves drilling a symmetrical pair of holes on each side of the core in a VAD (vapor phase axial deposition) preform and then a boron-doped preform (with a different coefficient of thermal expansion) is inserted into each hole. This composite preform is then drawn in the usual way to produce a solid fiber in which the stress-producing sectors are formed by the boron-doped MCVD preforms. This methodology can be modified to produce a side-hole cane 10 by inserting hollow silica glass rods in place of the boron-doped preforms. Still other manufacturing techniques are possible. For example, the cane waveguide 20 can be pulled from a solid perform, or formed from collapsing a glass tube on a standard fiber, and then drilled to create the side-holes into the cane 20 by using either an Excimer laser, mechanically or by other known drills. For embodiments incorporating a Bragg grating, as disclosed in further detail herein, the grating would preferably be imprinted into the cane after formation of the holes 12.

The side-holes 12 inherently cause an asymmetry in the stress exerted on the core 14, thus causing an "intrinsic" birefringence, $B_i$, which is present even when the side-hole cane 10 is not subject to an external pressure, P. When external pressure is applied, this pressure is converted into an anisotropic (directionally based) stress in the core region of the fiber, which additionally causes a pressure-related birefringence, $B_P$. The total birefringence may be expressed as follows:

$$B_{total} = B_i + B_p \qquad \text{Eq. 1}$$

In a standard cane waveguide 20, different polarizations of light propagate at generally the same velocity. However, in a birefringent cane 10, different polarizations of light propagate at different velocities due to the asymmetrical stress created on the core. In reality, what is normally considered a single-mode cane (or fiber) is really dual-mode due to the fact that there are two possible degenerate polarization modes of light traveling orthogonally to each other. More specifically, a first mode propagates along the x-axis (i.e., the axis defined by connecting the centers of the side-holes 12) and a second mode propagates along the y-axis (which is orthogonal to both the x-axis and the axis of the core). A birefringent cane causes light traveling along the x-axis to have an effective index of refraction of $n_x$, which is lower than the effective index of refraction of light traveling along the y-axis, $n_y$. The asymmetric stress of the birefringent cane thus effectively causes light traveling along the x-axis to travel faster than light traveling along the y-axis.

When a pressure is applied to the birefringent cane, the effective index of refraction along each axis changes even further. Thus the total birefringence of the cane, whether intrinsic or by an external pressure, is related to the indicies of refraction as follows:

$$B_{total} \alpha \, n_x - n_y \qquad \text{Eq. 2}$$

Figure 5:
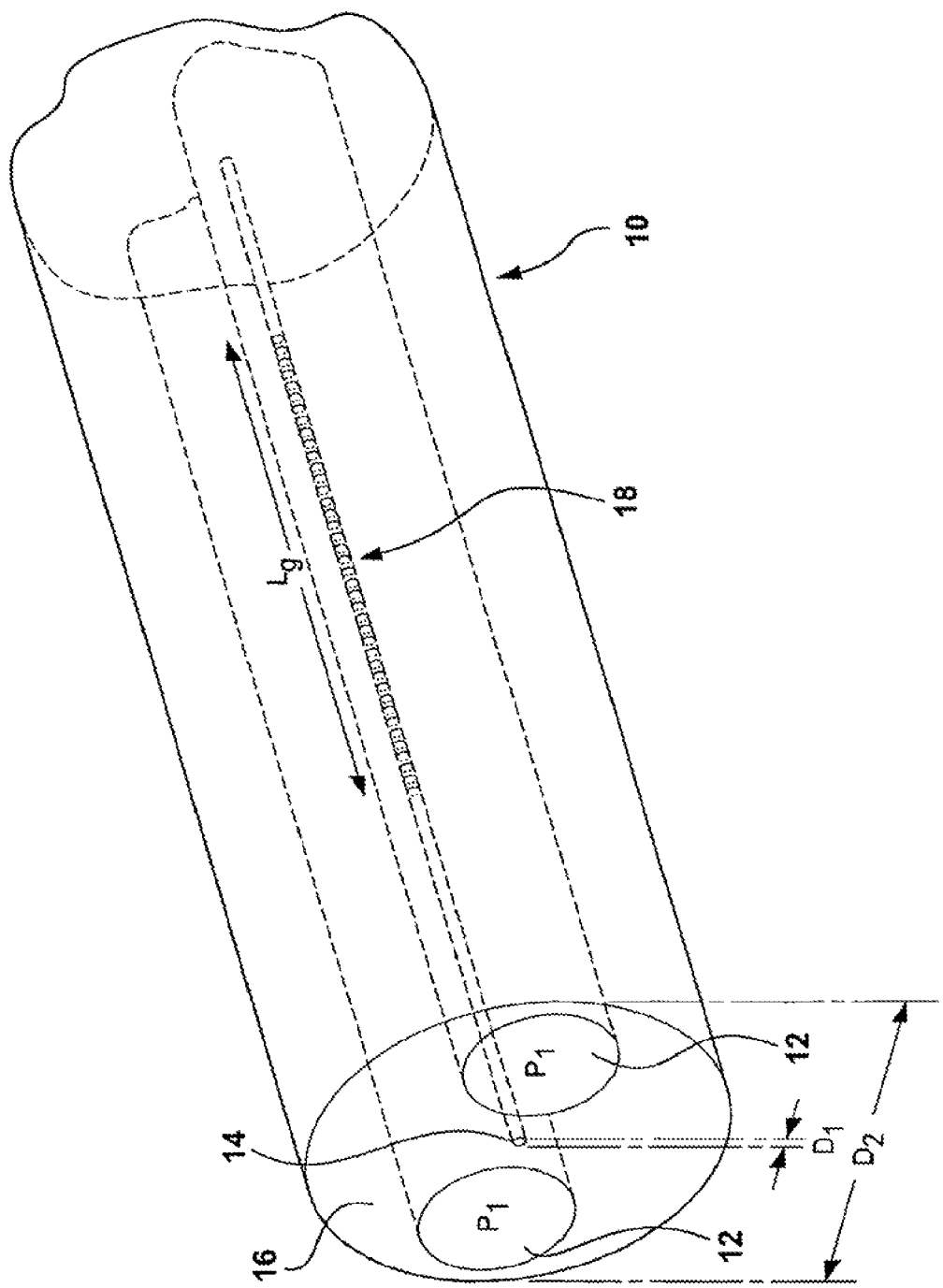
FIG. 5 is a side view perspective of a side-hole cane containing a Bragg grating, in accordance with one embodiment of the present invention.

Although the side-hole cane 10 can operate as a pressure sensor in accordance with these principles without the addition of a separate sensing element, it is preferred to incorporate a Bragg grating into the side hole cane structure. Referring to FIG. 5, when a Bragg grating 16 is written into the core 14 of the side-hole cane 10, it will reflect two wavelengths of light due to the two polarization modes explained above. From this reflection, the pressure exerted on the cane may be determined as will be explained in more detail below. A Bragg grating 18, as is known, is a periodic or aperiodic variation in the effective refractive index and/or effective optical absorption coefficient of the core of a waveguide, and may be formed in accordance with the methods disclosed in U.S. Pat. Nos. 4,725,110 and 4,807,950, entitled "Method for Impressing Gratings Within Fiber Optics," to Glenn et al., and U.S. Pat. No. 5,388,173, entitled "Method and Apparatus for Forming Aperiodic Gratings in Optical Fibers," to Glenn, which are hereby incorporated by reference. The grating 18 may be in the core 14 and/or in the cladding 16 (not shown). Any wavelength-tunable grating or reflective element embedded, etched, imprinted, or otherwise formed in the cane waveguide 10 may be used if desired, all of which constitute "gratings" for purposes of this disclosure. Further, the reflective element (or grating) 18 may be interrogated by assessing reflection of light therefrom, or by assessing transmission of light therethrough.

As is known, a Bragg grating reflects a particular wavelength or frequency of light that is propagating along the fiber core. The particular wavelength of light reflected by each Bragg grating, known as the Bragg reflection wavelength $\lambda_B$, is determined by the Bragg grating spacing, $\Lambda$, and the effective index of refraction, $n_{eff}$, as shown in the following equation:

$$\lambda_B = 2 n_{eff} \Lambda \qquad \text{Eq. 3}$$

Figure 6:
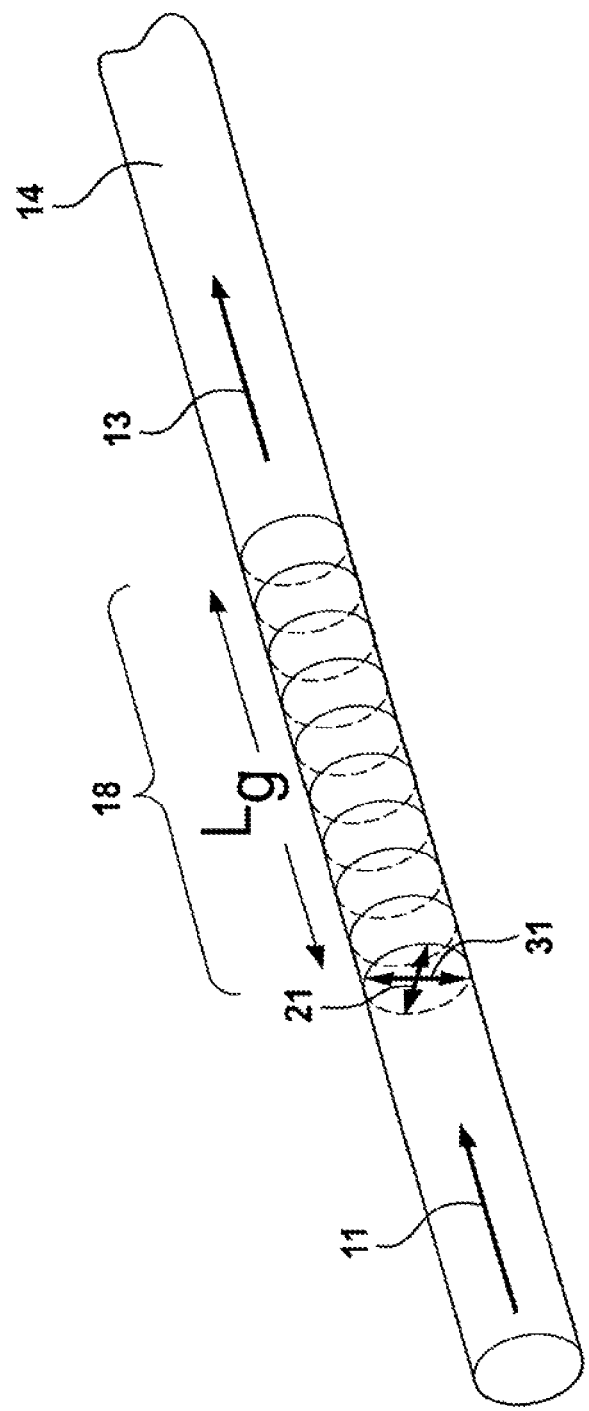
FIG. 6 is an exploded side view of a core containing a Bragg grating, in accordance with one embodiment of the present invention.

As stated previously, in a birefringent fiber, the two orthogonal modes of light have different index of refractions, $n_x$ and $n_y$, and travel at different velocities. This imparts a duality to $n_{eff}$ which in turn yields two Bragg reflection wavelengths, $\lambda_{Bx}$ and $\lambda_{By}$. This is shown in FIG. 6, which illustrates incident light 11 entering into the birefringent region containing a Bragg grating 18. The two orthogonal modes of light at first and second wavelengths are reflected by the Bragg grating 18 back in the direction of the light source (not shown) along the x-axis 21 and y-axis 31. The extent of the split between the first and second Bragg reflection wavelengths, $\lambda_{Bx}$ and $\lambda_{By}$ ($\Delta\lambda_B = |\lambda_{Bx} - \lambda_{By}|$), is proportional to the pressure incident on the grating, and therefore can be calibrated to allow the birefringent grating to operate as a pressure sensor. The difference in Bragg wavelength $\Delta \lambda_B$ is given by:

$$\Delta\lambda_B = 2(n_x - n_y) \Lambda \alpha 2(B_i + B_p) \Lambda \alpha 2(B_i \Lambda + 2\eta P \Lambda) \qquad \text{Eq. 4}$$

where $\eta$ is a coefficient that defines the birefringence of the side-hole cane per unit change in pressure. Because the intrinsic birefringence $B_i$ can be determined without the application of pressure (i.e., when P=0), and because $\Lambda$, $\eta$, and $\Delta \lambda_B$ are known or can be measured or calculated, the pressure P impingent upon the side-hole cane 10 can then be determined.

One skilled in the art will recognize that temperature also affects the Bragg reflection wavelength, because thermal expansion or contraction of the grating will affect the grating spacing $\Lambda$ (see Eq. 3 above). However, such thermal effects shift the Bragg reflection wavelengths $\lambda_{Bx}$ and $\lambda_{By}$ by equal amounts, making their difference $\Delta\lambda_B$ constant. Accordingly, and in accordance with Eq. 4 above, the disclosed side-hole cane 10 structure can operate as a pressure sensor which is insensitive to temperature and therefore does not require temperature compensation.

However, the disclosed side-hole cane 10 structure can also be used as a temperature sensor which is insensitive to pressure. For example, temperature may be determined by measuring at least one peak reflection wavelength as well as its shift as is disclosed in U.S. Pat. No. 5,399,854, entitled "Embedded Optical Sensor Capable of Strain and Temperature Measurement Using a Single Diffraction Grating," which is incorporated by reference in its entirety. In short, the disclosed side-hole cane 10 structure is elegant in that it allows both temperature and/or pressure to be determined through use of a single sensing element.

Referring again to FIG. 6, while interrogation of the disclose side-hole cane sensor has been discussed in terms of interpreting the incident light 11 reflected from the sensor (i.e., 21, 31), one skilled in the art will also recognize that the same analysis can be performed by assessing those portion of incident light that are transmitted 13 through the sensor.

Because the two modes of light travel along two orthogonal x- and y-axes, it may be preferable to insert a depolarizer (not shown) near the light source (not shown) such that both modes of light interrogate the sensor to their fullest extent. More specifically, it is preferable in a reflective mode of operation to insert the depolarizer between the light source and a circulator connected to the photoreceiver such that the reflected light from the pressure sensor would not pass back through the depolarizer but would proceed directly to the photo receiver. If a broadband light source is used, a passive depolarizer such as a Lyot depolarizer may be used. If the system uses a narrowband light source, devices such as a polarization scrambler or polarization controller may be used. As is known, if one polarization axis receives more light than the other, that individual mode may dominate, making an assessment of the difference between the reflections difficult.

Figure 3:
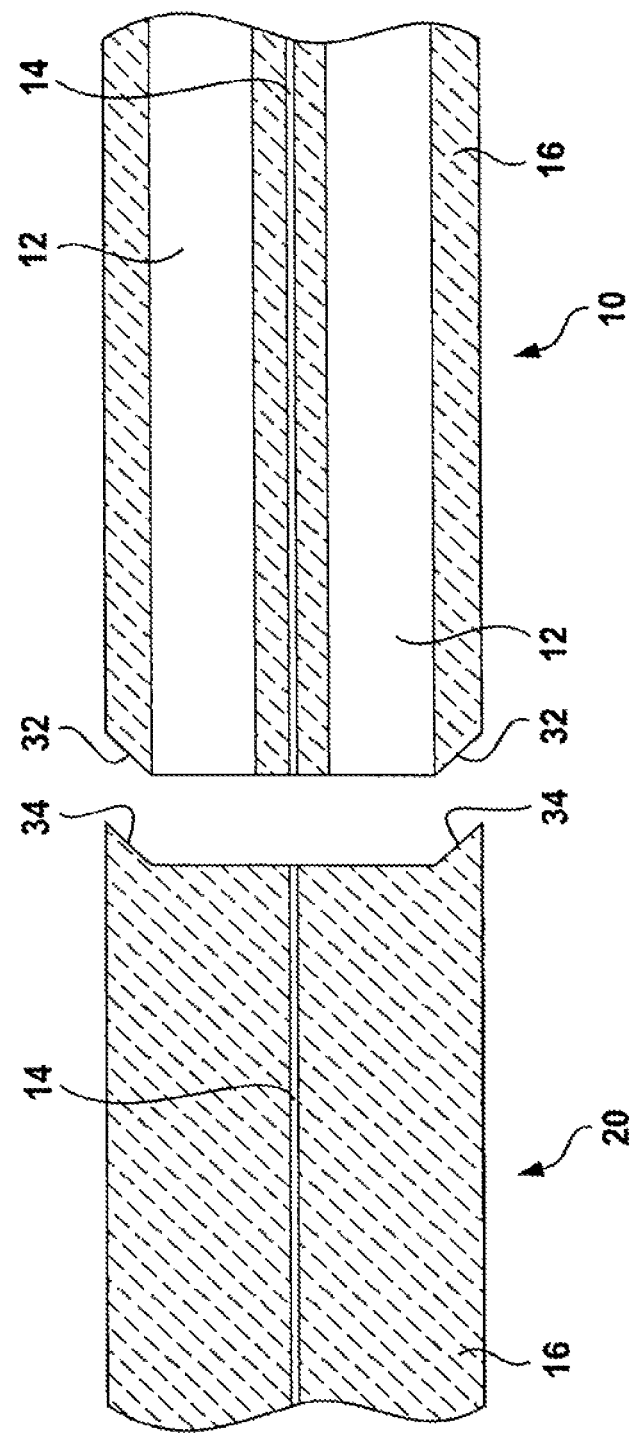
FIG. 3 is a cross-sectional view of a solid cane and a side-hole cane with beveled edges to facilitate their connection, in accordance with one embodiment of the present invention.
Figure 4:
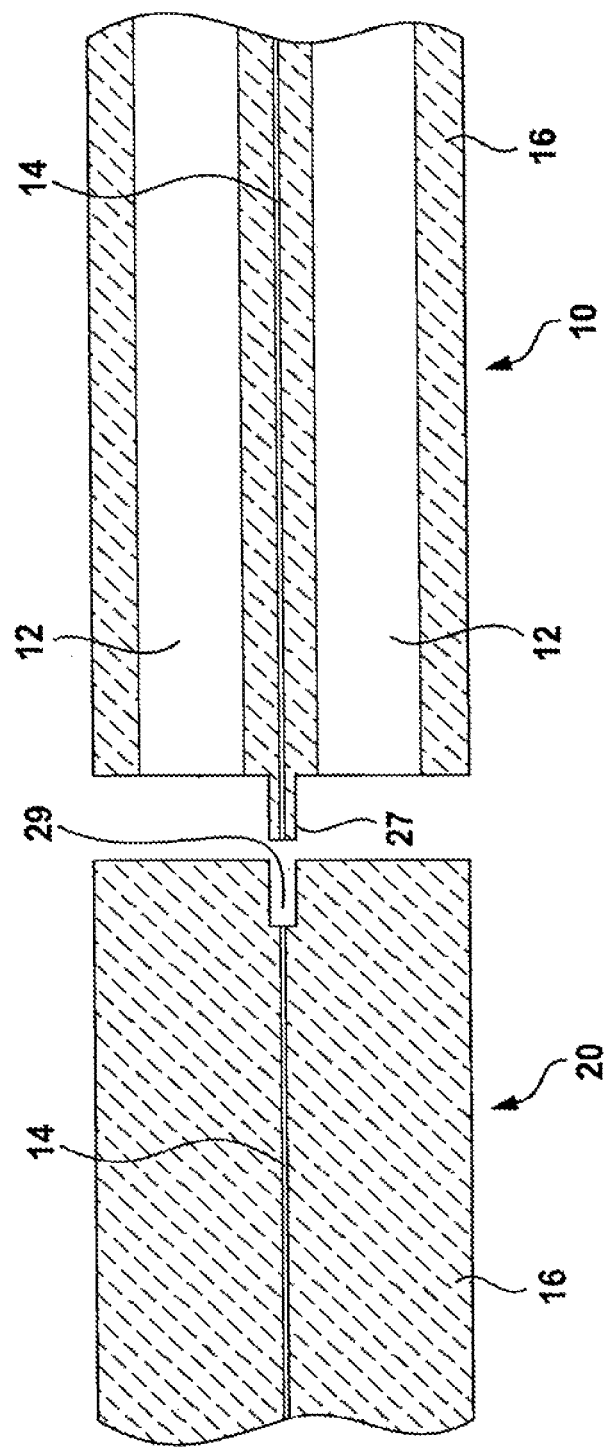
FIG. 4 is a cross-sectional view of a solid cane and a side-hole cane joinable by a protrusion/pocket arrangement, in accordance with one embodiment of the present invention.

FIGS. 3 and 4 illustrate various ways in which the disclosed side-hole cane sensor can be attached to various to other pieces of cane to form useful structures. As shown in FIG. 3, the side-hole cane 10 may adjoin to a cane waveguide by grinding or etching the edges to provide tapered, beveled, or angled outer edges 32 or 34. These edges 32 and 34 provide a means for mating the cane waveguide 10 with another structure such as, for example, another side-hole cane, a standard cane waveguide 20, or another structure such as an end cap, a housing, or a large diameter splice (which is described in further detail below). An alternative embodiment for mating the a side-hole cane 10 is disclosed in FIG. 4, in which a central portion of the side-hole cane 10 extends outward to form a projection 27 which mates with a receiving pocket 29 formed into the structure to be joined. This protrusion 27 or pocket 29 may also be joined to other structures, such as a large diameter splice or standard fiber. Similarly, this projection/pocket arrangement could be formed on the outside diameter of the cladding 16 and away from the core 14, or in the bulk of the cladding 16 between its outside diameter and the core 14. Once mechanically joined, the pieces can be fused together with heat or glued or cemented, or in certain applications not requiring a firm connection may constitute a press fit. Of course, care will need to be taken to ensure that the cores 14 of the joined structures are aligned and can communicate light with acceptable levels of loss.

Figure 7:
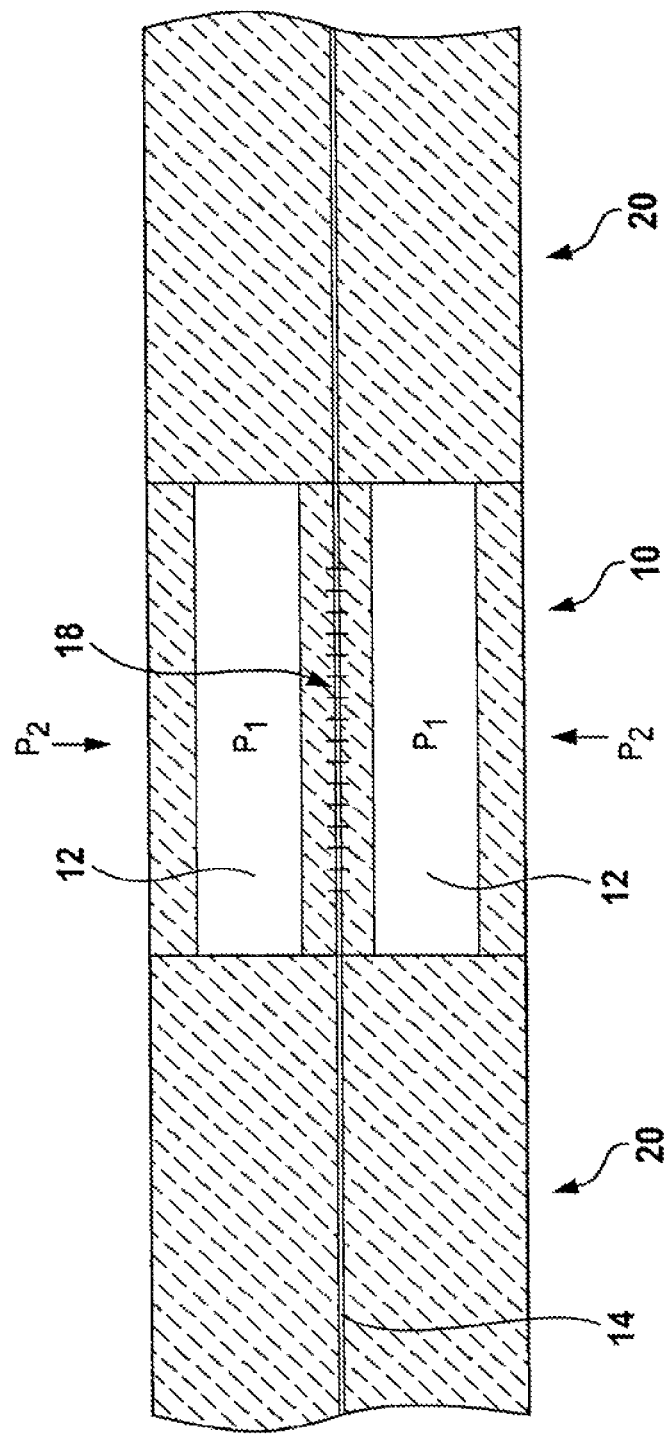
FIG. 7 is a cross-sectional view of a side-hole cane disposed between two pieces of solid cane, in accordance with one embodiment of the present invention.

FIG. 7 depicts an embodiment where a side-hole cane waveguide 10 is disposed between two standard cane waveguides 20 used as end caps to form a sensor assembly. The edges may be fusion sealed by a standard fusion arc technique, heated by a resistive heater element to approximately 1000° C. or more, and/or structurally mated as described above if desired. By sealing the side-hole cane 10 to the standard cane 20, a first pressure $P_1$ present within the side-holes 12 can be fixed and hermetically sealed. Thus, in the embodiment illustrated in FIG. 7, the sensor measures a radial pressure $P_2$ with reference to a sealed volume of gas or liquid $P_1$. When radial pressure $P_2$ compresses the cane waveguide 10, the degree of split between the first and second wavelengths reflected by the Bragg grating 18 is proportional to the amount of pressure $P_2$ exerted relative to the internal pressure $P_1$. While air is preferred for use within the sensor, other inert gases such as nitrogen or argon, or a liquid, such as silicone or mineral oil, could be used as well in the various embodiments disclosed herein.

Figure 8:
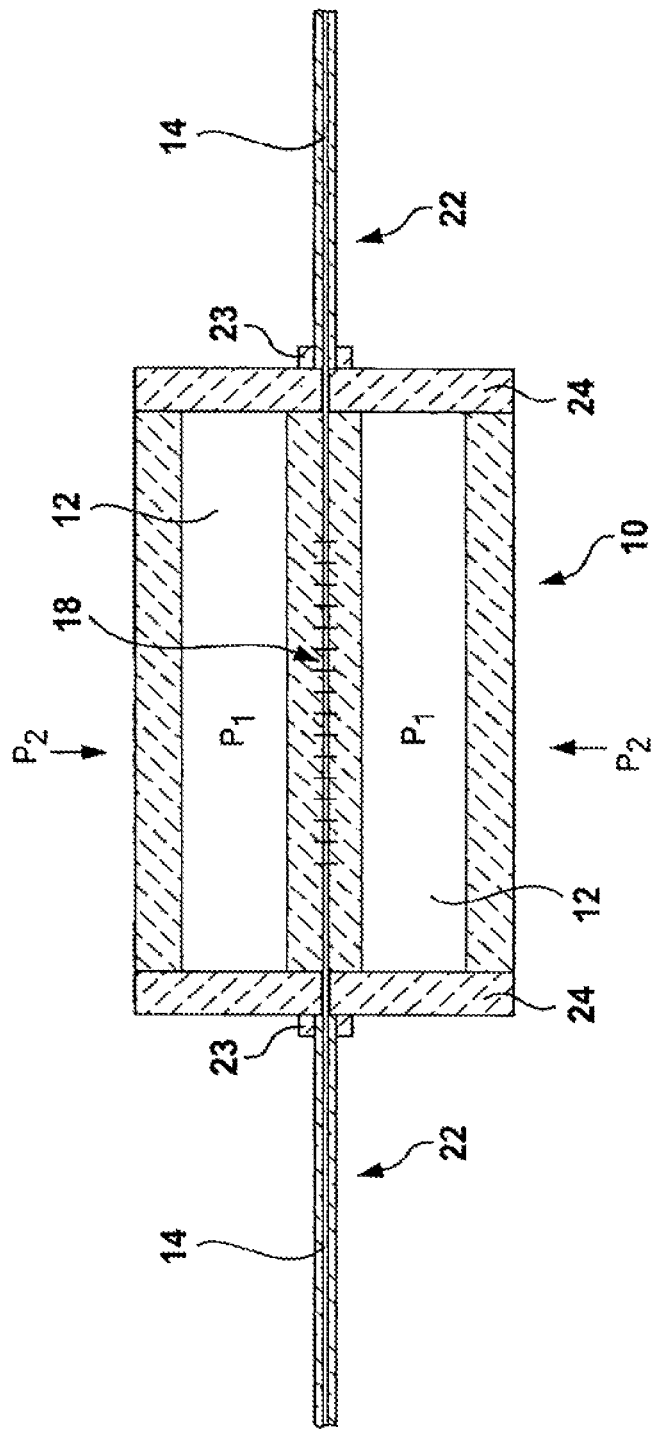
FIG. 8 is a cross-sectional view of a side-hole cane disposed between two pieces of standard fiber, in accordance with one embodiment of the present invention.

FIG. 8 illustrates another embodiment of a sensor assembly in which a side-hole cane 10 is disposed between portions of standard optical fiber 22. Glass end caps 24 seal gas at pressure $P_1$ within the side-holes 12, and are preferably fused to the ends of the side-hole cane 10. These glass end caps 24 may be formed from slices of standard cane 20 so that the end caps 24 contain a core region for propagating the light from the side-hole cane 10. Solid glass or metal end caps could also be used depending on the application at hand, although in such an application the end caps would need to contain holes for accommodating the large diameter splices 23 (explained below). Furthermore, the end caps 24 may be ground such that a protrusion (not shown) exists on the opposite side of the end cap 24 from the side attached to the side-hole cane 10. This protrusion may allow for easier attachment to the large diameter splices 23 or may even be angled to effectively terminate the propagation of light, depending on the application desired. In the embodiment of FIG. 8, the sensor assembly is dual ended and can be multiplexed to other optical devices (e.g., using well-known wavelength division multiplexing or time division multiplexing techniques) to form an array. If only a single-ended sensor assembly is desired (e.g., if the sensor assembly constitutes the last sensor assembly in an array), then alternatively a solid end cap can be used (not shown) thus terminating the light propagation through the core 14. To attach a metal end cap to the side-hole cane 10, a metal to glass sealant should be used, many of which exist in the art. As one skilled in the art will recognize, the material for the end cap should be suitable for the intended environment in question. For example, if the sensor apparatus is to be deployed into an oil well to measure the hydrostatic pressures in the production pipe or the well annulus, metal end caps may not be suitable as they may be susceptible to corrosive temperatures and extreme temperatures that exist downhole.

Regardless of the assembly to be used in conjunction with the side-hole cane 10, it is generally required to couple the cane and/or its supporting assembly structures to a standard piece to communication optical fiber (e.g., 125 micron fiber). To enable this coupling, a large diameter splice 23 may be used, which preferably constitutes a short section of a 1 mm-diameter glass capillary tubing which has been heated to collapse and fuse around the end of a standard fiber 22 to build up its diameter. The increased diameter of the splice 23 provides more bulk material to the end of the standard fiber, which makes it easier to fusion splice that end to the side-hole cane 10, and additionally constitute a more rigid connection less susceptible to breaking The fiber 22 and splice 23 are preferably joined to the side-hole cane 10 to bring their cores into alignment to ensure minimal optical attenuation at this junction. Fusion splicing of optical waveguides is well known in the art and the details of such procedures are therefore not further discussed.

The sensor apparatus of FIG. 8 can be manufactured in any number of ways. The end caps 24 can first be connected to the side-hole cane 10, and thereafter the splices can be coupled to the resulting structure. Or, the splices can be attached to the cane 10 first, and thereafter the end caps 24 slid into place by passing the cable 22 and/or splice 23 through a hole in the end caps. Either way, the end caps 24 are sized so as to abut against the ends of the cladding 16 of the side-hole cane 10, although the end caps 24 can contain a hole to allow a portion of the cane's core to pass therethrough if necessary. The end caps 24 may be fused, glued or cemented to the side-hole cane 10 and to the splice 23 to hermetically seal the holes 12 at a desired pressure $P_1$. Alternatively, the end caps can constitute plugs (not shown) which merely fit within and seal off the holes 12. Other steps or configurations are possible. As with the embodiment of FIG. 7, gas or liquid can be sealed within the side-holes 12 to create a pressure sensor that, when calibrated, can measure external pressure $P_2$ relative to $P_1$.

In the embodiments of FIGS. 7 and 8, the internal pressure within the side-hole cane 10 is fixed to a desired pressure $P_1$, which allows an absolute measurement of external pressure $P_2$ to be made, in what may be referred to as an absolute pressure sensor arrangement. However, the basic design is easily modified so that both the internal pressure $P_1$ and the external pressure $P_2$ are allowed to vary, such that the sensor assembly measures the differential pressure between the two. Examples of such a differential pressure sensor arrangement are shown in FIGS. 9 and 10.

Figure 9:
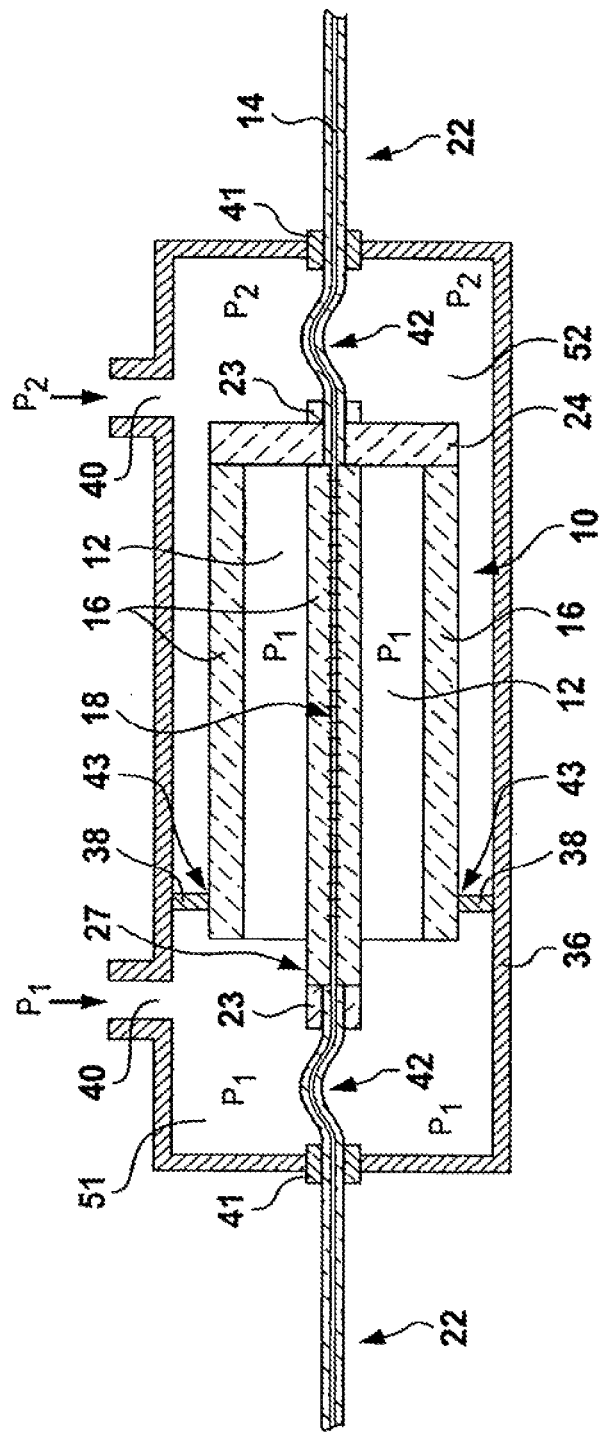
FIG. 9 is a cross-sectional view of a side-hole cane surrounded by a housing partitioned into two chambers for measuring a differential pressure, in accordance with one embodiment of the present invention.
Figure 10:
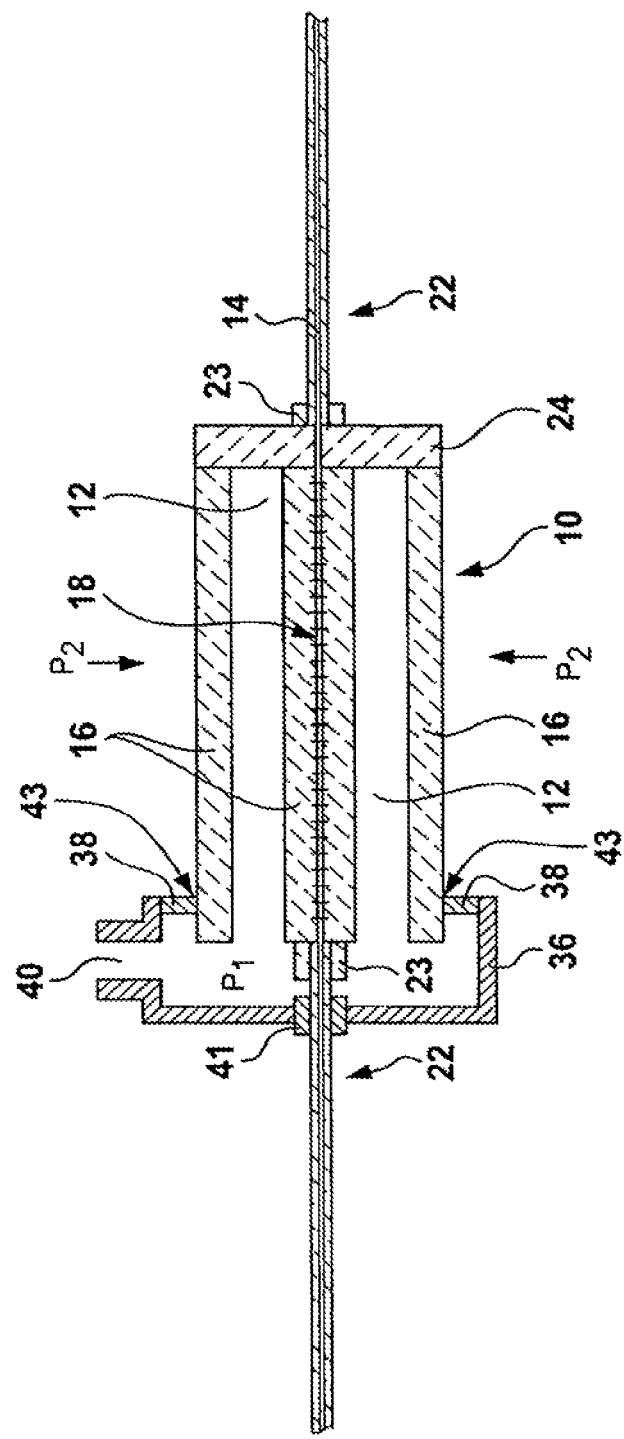
FIG. 10 is a cross-sectional view of a side-hole cane partially enclosed by a housing for measuring a differential pressure, in accordance with one embodiment of the present invention.

In FIG. 9, the side-holes 12 of the side-hole cane 10 are sealed at one end by an end cap 24 using the methods described above. The core 14 of the side-hole cane 10 is joined to standard fibers 22 using large diameter splices 23, again as discussed previously. To enable the side-hole cane 10 to measure differential pressure, a housing 36 surrounds the side-hole cane 10. A first standard fiber 22 enters into the housing 36 by a hermetic feed-through seal 41, many of which are known in the art, to join to the core region of the side-hole cane by way of a large diameter splice 23. A protrusion 27 may be formed in the side-hole cane 10 to assist in joining with the splice 23, although this is not strictly necessary. A second standard fiber 22 joins to the end cap 24 of the side-hole cane 10 by way of a second large diameter splice 23 and exits through the housing 36 by a second hermetic feed-through seal 41. An S-bend curve 42 may further be formed in the standard fiber 22 for strain relief, as is well known. The housing 36 defines two pressure chambers 51, 52 for each of the pressures $P_1$ and $P_2$ respectively, and a ring-shaped partition 38 isolates each chamber 51, 52 from each other and otherwise assists in mounting the cane 10 within the housing 36. The housing and partitions are preferably made of metal, although other known materials may be used as well, such as glass or ceramic materials, depending on the target environment in question. The use of glass materials allows the assembly to be fused together, which may provide better mechanical stability and corrosion resistance for deployment in harsh environments such as within an oil/gas well. If made of metal, the partition 38 joins to the side-hole cane 10 by standard glass-to-metal sealants 43.

The housing 36 further contains two portholes 40 that enable one to port the pressures of interest into each respective chamber 51, 52 as desired. As noted, the difference between the two wavelengths reflected by the Bragg grating 18 correlates with the difference in pressure between $P_1$ and $P_2$. Either fluids or gases can be ported into the sensor assembly of FIG. 9. If a liquid pressure is to be measured, but it is not desired to port liquid directly into the sensor, baffling schemes to transfer pressure from the liquid(s) of interest to the gases residing within the chambers in the housing 36 can be accomplished by the techniques disclosed in U.S. Pat. No. 6,439,055, entitled "Pressure Sensor Packaging for Harsh Environments," issued Aug. 27, 2002, which is incorporated herein by reference in its entirety, or by other known techniques.

The present invention also contemplates the use of a housing 36 or separate portholes 40 which are configured to effectively isolate one side-hole 12 from the other, and thereby enabling one to alter the pressure within each hole, effectively a $P_{1a}$ and a $P_{1b}$. As one skilled in the art will realize, by altering the pressure within each individual side-hole 12, the side-hole cane 10 may bend in response to the asymmetrical stress distribution on the side-hole cane 10 structure, which may or may not be desirable for a given application.

FIG. 10 illustrates a similar sensor assembly for measuring a differential pressure, but in this embodiment the housing 36 surrounds only one side of the side-hole cane 10. The housing includes a single porthole 40 for porting pressure $P_1$ into the side-holes 12 of the sensor assembly. The external pressure $P_2$ is presented directly to the outside of the side-hole cane 10, as in FIGS. 7 and 8. A ring-shaped partition 38 helps to isolate the internal pressure $P_1$ from the external pressure $P_2$. This partition 38 joins to the side-hole cane 10 by a glass-to-metal sealant 43 as describe above. In an alternative embodiment, the partition 38 may also constitute a portion of the housing 36 itself, and may be directly fused, glued, or cemented to the side-hole cane 10 without the need for the additional intervening structures. As in FIG. 9, a standard fiber 22 is coupled to the sensor assembly and passes through the housing 36 by a hermetic feed-through seal 41. (A fiber stress relief S-bend may also be used but is not shown). This fiber 22 then joins directly to the core region of the side-hole cane 10 by methods described previously. Another standard fiber 22 joins to the end cap 24 by using a large diameter splice 23 as also described previously. As in FIG. 9, the split between the two wavelengths reflected by the Bragg grating 18 corresponds to the difference in external pressure $P_2$ and the internal pressure $P_1$. As realized by one skilled in the art, the housing 36 may form any shape such that the housing 36 effectively isolates the $P_1$ chambers within the side-holes.

The absolute pressure sensors in FIGS. 7 and 8 and the differential pressure sensors in FIGS. 9 and 10 may be configured and housed in other ways as well. Several configurations and housing for both absolute pressure sensors and differential pressure sensors and other techniques which are applicable to the side-hole cane pressure sensors disclosed herein may be found in U.S. Pat. No. 6,422,084, entitled "Bragg Grating Pressure Sensor," issued Jul. 23, 2002, which is incorporated herein by reference in its entirety. Additionally, to the extent that the sensor assembly are glass, and therefore subject to swelling and chemical attack by moisture ingress, the assemblies (either the side-hole canes and/or any associated housings) can be coated (e.g., with gold) as is described in U.S. patent application Ser. No. 09/494,417, filed Jan. 31, 2000, and entitled "Fluid Diffusion Resistant Glass-Encased Fiber Optic Sensor," which is incorporated herein by reference in its entirety.

The disclosed cane-based birefringent sensors have many advantages when compared to the fiber-based birefringent sensors disclosed earlier. First, because the cane waveguide 10 has a large outer diameter and cladding when compared to that of a standard optical fiber 22 (e.g., 125 microns), the cane waveguide 10 does not require a protective buffer, which simplifies various steps in the manufacturing process.

Second, the large outer diameter $D_2$ of the cane waveguide 10 allows the cane waveguide 10 to be ground, etched, or machined while retaining the mechanical strength of the cane waveguide 10. Accordingly, cane can be ground to a particular desired diameter, or shaped to facilitate connection with other components such as in the ways disclosed earlier. Cane can initially be formed with a 4 mm outside diameter, and then can be milled to a desired operating diameter (usually after a grating has been written into it), which allows birefringent sensors such as those disclosed herein to be tailored to a particular application. By contrast, fibers, usually 125 microns in diameter, cannot be easily ground, etched or machined without suffering significant mechanical damage. Because it is easy to mechanically work, the cane waveguide 10 may have cross-sectional shapes other than circular, such as square, rectangular, elliptical, clamshell, octagonal, multi-sided, or any other desired shapes, which may be preferable for a given application. Such shaping can also allow the core to be made off-center with respect to the outside surface of the cladding.

Third, the mechanical robustness of cane makes it much easier to house when compared with fiber-based birefringent sensors. As is known, when working with fiber-based sensors, the fibers themselves often need to be made more mechanically robust to work in a harsh environment, as is disclosed in incorporated reference U.S. Pat. No. 6,422,084. As that patent shows, a fiber-based sensor will often need to be housed for protection, or the fiber themselves will need to be "built up" in size by the addition of fused glass capillary tubes to make them suitable for use in harsh deployment such as down an oil/gas well. However, as FIGS. 7, 8, and 10 make clear, housing structures are not required for cane-based sensors (although they can be beneficial as in the embodiment of FIG. 9). Indeed, the cane itself can essentially act as a housing in some applications, and can be directly exposed to the media whose pressure is to be measured. These structural benefits are recognized in the cane-based birefringent embodiments disclosed herein, and without the need for temperature compensation suggested by the non-birefringent embodiments disclosed in U.S. Pat. No. 6,422,084.

Fourth, cane-based birefringent sensors allow a greater range of pressure to be sensed than do fiber-based birefringent sensors, as the thickness of the cane will withstand greater mechanical deformation. Specifically, the cane structure allows for a greater compression range due to its relatively small length to diameter aspect ratio when compared to standard fibers.

In short the disclosed side-hole cane-based birefringent optical sensor disclosed herein represents a significant advance over fiber-based birefringent optical sensors or other cane-based optical sensors.

The dimensions and geometries for any of the embodiments described herein are merely for illustrative purposes and, as such, any other dimensions may be used if desired, depending on the application, size, performance, manufacturing requirements, or other factors, in view of the teachings herein.

The grating used in the disclosed embodiments may be tuned by mechanically stressing (i.e., tension, bending) the grating elements, or by varying the temperature of the grating (i.e., using a heater) as is described in U.S. Pat. No. 5,007,705, entitled "Variable Optical Fiber Bragg Filter Arrangement," to Morey et al., which is incorporated herein by reference, or by varying the pressure in each of the cane waveguide holes independently.

"Cane" as used herein, used herein, and as is clear from the foregoing description, should not be construed to include structures with cladding diameters similar to those found in tradition communication optical fibers (e.g., of 125 micron diameters).

What is claimed is:

1. An apparatus for measuring a differential pressure, comprising:
   an optical cane waveguide having first and second ends, comprising:
      a core; and
      a cladding surrounding the core, the cladding comprising an outer surface and containing at least two side-holes parallel to the core;
   a cap abutting the first end; and
   a housing comprising:
      a first porthole in fluid communication with the side-holes at the second end via a first volume; and
      a second porthole in fluid communication with the outer surface of the cladding via a second volume.

2. The apparatus of claim 1, wherein the housing comprises a partition for isolating a first pressure of the first volume from an external pressure of the second volume.

3. The apparatus of claim 2, wherein the partition comprises a ring-shaped partition.

4. The apparatus of claim 2, wherein the partition is configured to mount the optical cane waveguide within the housing.

5. The apparatus of claim 1, wherein the housing is affixed to the second end of the waveguide.

6. The apparatus of claim 1, wherein the housing is configured to isolate a first one of the side-holes from a second one of the side-holes, such that a first pressure is ported to the first one of the side-holes and a second pressure is ported to the second one of the side-holes.

7. The apparatus of claim 1, wherein the housing surrounds the waveguide.

8. The apparatus of claim 1, wherein the core comprises a sensor.

9. The apparatus of claim 8, wherein the sensor comprises a Bragg grating.

10. The apparatus of claim 9, wherein the sensor reflects first and second spectral regions being respectively centered about first and second wavelengths.

11. The apparatus of claim 10, wherein a spectral separation between the first and second wavelengths varies in response to a differential pressure, the differential pressure being the difference between an external pressure of the second volume and a first pressure of the first volume.

12. The apparatus of claim 10, wherein the first and second wavelengths shift in response to temperature.

13. The apparatus of claim 1, wherein the waveguide has a diameter of at least 0.3 mm.

14. The apparatus of claim 1, wherein the waveguide has a cladding-to-core ratio of at least 30 to 1.

15. The apparatus of claim 1, wherein the waveguide is formed of silica glass.

16. The apparatus of claim 1, further comprising an optical fiber for connecting with the waveguide at the first or second end, wherein the fiber passes through the housing at a hermetic seal.

17. The apparatus of claim 16, further comprising a splice for joining the fiber to the waveguide.

18. The apparatus of claim 16, further comprising a bend in the fiber in between the hermetic seal and the waveguide for providing strain relief.

19. The apparatus of claim 1, wherein the cap comprises a core for optically connecting with the waveguide core.

20. The apparatus of claim 1, wherein the cap comprises plugs configured to fit within and seal off the at least two side-holes at the first end.

21. An apparatus for measuring a differential pressure, comprising:
- an optical cane waveguide having first and second ends, comprising:
  - a core; and
  - a cladding surrounding the core, the cladding comprising an outer surface and containing at least two side-holes parallel to the core, wherein the outer surface is exposable to an external pressure;
- a cap abutting the first end; and
- a housing having a first porthole and a second porthole, wherein the first porthole is in fluid communication with a first one of the side-holes at the second end and wherein the second porthole is in fluid communication with a second one of the side-holes at the second end, wherein a first pressure of the first one of the side-holes is isolated from a second pressure of the second one of the side-holes.

22. The apparatus of claim 21, wherein the housing is affixed to the second end of the waveguide.

23. The apparatus of claim 21, wherein the waveguide has a diameter of at least 0.3 mm.

24. The apparatus of claim 21, wherein the waveguide has a cladding-to-core ratio of at least 30 to 1.

25. The apparatus of claim 21, wherein the core comprises a Bragg grating.

26. The apparatus of claim 25, wherein the Bragg grating reflects first and second spectral regions being respectively centered about first and second wavelengths.

27. The apparatus of claim 26, wherein a spectral separation between the first and second wavelengths varies in response to a differential pressure, the differential pressure being the difference between the external pressure and the first or second pressure.

28. The apparatus of claim 21, further comprising an optical fiber for connecting with the waveguide at the first or second end, wherein the fiber passes through the housing at a hermetic seal.

* * * * *